US011349618B2

(12) United States Patent
Shin et al.

(10) Patent No.: US 11,349,618 B2
(45) Date of Patent: *May 31, 2022

(54) METHOD AND APPARATUS FOR TRANSMITTING AND RECEIVING REFERENCE SIGNAL IN WIRELESS COMMUNICATION SYSTEM

(71) Applicant: Samsung Electronics Co., Ltd., Gyeonggi-do (KR)

(72) Inventors: Cheol Kyu Shin, Gyeonggi-do (KR); Jeong Ho Yeo, Gyeonggi-do (KR); Young Woo Kwak, Gyeonggi-do (KR); Hoon Dong Noh, Gyeonggi-do (KR); Hyun Il Yoo, Gyeonggi-do (KR)

(73) Assignee: Samsung Electronics Co., Ltd

( * ) Notice: Subject to any disclaimer, the term of this patent is extended or adjusted under 35 U.S.C. 154(b) by 57 days.

This patent is subject to a terminal disclaimer.

(21) Appl. No.: 16/883,682

(22) Filed: May 26, 2020

(65) Prior Publication Data
US 2020/0287684 A1 Sep. 10, 2020

Related U.S. Application Data

(63) Continuation of application No. 16/193,588, filed on Nov. 16, 2018, now Pat. No. 10,666,408.

(30) Foreign Application Priority Data

Nov. 17, 2017 (KR) .................. 10-2017-0154299
Nov. 24, 2017 (KR) .................. 10-2017-0158917

(51) Int. Cl.
*H04W 72/12* (2009.01)
*H04L 5/00* (2006.01)

(52) U.S. Cl.
CPC .......... *H04L 5/0048* (2013.01); *H04L 5/0007* (2013.01); *H04L 5/0078* (2013.01); *H04L 5/0098* (2013.01)

(58) Field of Classification Search
CPC ............. H04W 72/14; H04W 72/1268; H04W 72/1215; H04L 5/0048; H04L 5/0007; H04L 5/0078; H04L 5/0098
See application file for complete search history.

(56) References Cited

U.S. PATENT DOCUMENTS 7,801,521 B2 * 9/2010 Dent .................. H04B 7/18506
455/431
10,756,862 B2 8/2020 Kim et al.
(Continued)

FOREIGN PATENT DOCUMENTS

EP 2 482 590 8/2012
KR 1020110119502 11/2011
(Continued)

OTHER PUBLICATIONS

Huawei, HiSilicon, "SRS Antenna Switching", R1-1718246, 3GPP TSG RAN WG1 Meeting #90bis, Oct. 9-13, 2017, 7 pages.
(Continued)

*Primary Examiner* — Wei Zhao
(74) *Attorney, Agent, or Firm* — The Farrell Law Firm, P.C.

(57) ABSTRACT

A method and user equipment for transmitting a sounding reference signal (SRS) of a user equipment in a wireless communication system are provided. The method includes calculating an SRS transmission count based on at least one of a numerology, an SRS periodicity, a number of SRS symbols, and an SRS repetition factor, and transmitting the SRS based on the SRS transmission count.

16 Claims, 5 Drawing Sheets

(56) References Cited

U.S. PATENT DOCUMENTS

2009/0180451 A1   7/2009  Alpert
2011/0249581 A1  10/2011  Jen
2012/0106489 A1   5/2012  Konishi et al.
2017/0302419 A1* 10/2017  Liu ........................ H04L 5/0082
2018/0206132 A1*  7/2018  Guo .................. H04W 72/0473

FOREIGN PATENT DOCUMENTS

KR     1020160087370     7/2016
WO   WO 2016/163805    10/2016

OTHER PUBLICATIONS

CATT, "Further Discussion on Remaining Issues on SRS", R1-1717820, 3GPP TSG RAN WG1 Meeting #90bis, Oct. 9-13, 2017, 4 pages.
OPPO, "Further Discussion on SRS Design for NR", R1-1718029, 3GPP TSG RAN WG1 Meeting #90bis, Oct. 9-13, 2017, 6 pages.
International Search Report dated Feb. 22, 2019 issued in counterpart application No. PCT/KR2018/014195, 10 pages.
European Search Report dated Mar. 4, 2021 issued in counterpart application No. 18879475.4-1205, 10 pages.
European Search Report dated Jun. 23, 2020 issued in counterpart application No. 18879475.4-1205, 9 pages.
Korean Office Action dated Sep. 7, 2021 issued in counterpart application No. 10-2017-0158917, 6 pages.
Indian Examination Report dated Apr. 19, 2022 issued in counterpart application No. 202037011820, 6 pages.

\* cited by examiner

METHOD AND APPARATUS FOR TRANSMITTING AND RECEIVING REFERENCE SIGNAL IN WIRELESS COMMUNICATION SYSTEM

CROSS-REFERENCE TO RELATED APPLICATION(S)

This continuation application is based on and claims priority under 35 U.S.C. § 120 to U.S. patent application Ser. No. 16/193,588, filed on Nov. 16, 2018, and issued as U.S. Pat. No. 10,666,408 on May 26, 2020 in the United States Patent and Trademark Office, which claimed priority under 35 U.S.C. § 119 to Korean Patent Application Serial Nos. 10-2017-0154299 and 10-2017-0158917, filed on Nov. 17, 2017 and Nov. 24, 2017, respectively, in the Korean Intellectual Property Office, the entire disclosures of which are incorporated herein by reference.

BACKGROUND

1. Field

The present disclosure relates generally to wireless communication systems and methods and apparatuses for appropriately providing services in wireless communication systems.

2. Description of Related Art

To meet the increase in demand for wireless data traffic after the commercialization of 4G communication systems, considerable efforts have been made to develop improved 5G communication systems or pre-5G communication systems. This is one reason why '5G communication systems' or 'pre-5G communication systems' are called 'beyond 4G network communication systems' or 'post long term evolution (LTE) systems'. In order to achieve a high data rate, 5G communication systems are being developed to be implemented in a super-high frequency band (millimeter wave (mmWave)) (e.g., a band of about 60 GHz). In order to reduce path loss in such a super-high frequency band and to increase a propagation distance of electric waves in 5G communication systems, various technologies such as beamforming, massive multiple-input multiple-output (massive MIMO), full dimensional MIMO (FD-MIMO), array antennas, analog beamforming, and large scale antennas are being studied. In order to improve system networks for 5G communication systems, various technologies such as evolved small cells, advanced small cells, cloud radio access networks (cloud RAN), ultra-dense networks, device-to-device communication (D2D), wireless backhaul, moving networks, cooperative communication, coordinated multi-points (CoMP), and interference cancellation have been developed. In addition, for 5G communication systems, advanced coding modulation (ACM) technologies such as hybrid frequency shift keying (FSK) and quadrature amplitude modulation (QAM) (FQAM) and sliding window superposition coding (SWSC) and advanced access technologies such as filter bank multi-carrier (FBMC), non-orthogonal multiple access (NOMA), and sparse code multiple access (SCMA) have been developed.

The Internet has evolved to the Internet of things (IoT), where distributed elements such as objects exchange information with each other to process the information. Internet of everything (IoE) technology, in which the IoT technology is combined with technology for processing big data through connection with a cloud server, is being newly provided. In order to implement the IoT, various technological elements such as a sensing technology, wired/wireless communication and network infrastructures, a service interface technology, and a security technology are required. In recent years, technologies related to sensor networks for connecting objects, machine-to-machine (M2M) communication, and machine type communication (MTC) have been studied. In the IoT environment, intelligent Internet technology services may be provided to collect and analyze data obtained from connected objects and thus to create new values in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, technologies related to sensor networks, M2M communication, MTC, etc., are implemented by using 5G communication technology including beamforming, MIMO, array antennas, etc. Application of a cloud RAN as the above-described big data processing technology may be an example of convergence of the 5G communication technology and the IoT technology.

As described above, with the development of wireless communication systems, various services are now provided, and thus, a way of appropriately providing these services is required.

SUMMARY

The present disclosure has been made to address at least the disadvantages described above and to provide at least the advantages described below.

Aspects of the present disclosure provide methods and apparatuses for appropriately providing services in wireless communication systems.

In accordance with an aspect of the present disclosure, a method of transmitting a sounding reference signal (SRS) of a user equipment in a wireless communication system is provided. The method includes calculating an SRS transmission count based on at least one of a numerology, an SRS periodicity, a number of SRS symbols, and an SRS repetition factor, and transmitting the SRS based on the SRS transmission count.

In accordance with an aspect of the present disclosure, a user equipment for transmitting an SRS in a wireless communication system is provided. The user equipment includes a transceiver, at least one memory storing a program for transmitting the SRS, and at least one processor configured to calculate an SRS transmission count based on at least one of a numerology, an SRS periodicity, a number of SRS symbols, and an SRS repetition factor, and transmit the SRS based on the SRS transmission count.

BRIEF DESCRIPTION OF THE DRAWINGS

The above and other aspects, features and advantages of certain embodiments of the disclosure will be more apparent from the following detailed description taken in conjunction with the accompanying drawings, in which.

DETAILED DESCRIPTION

Figure 1:
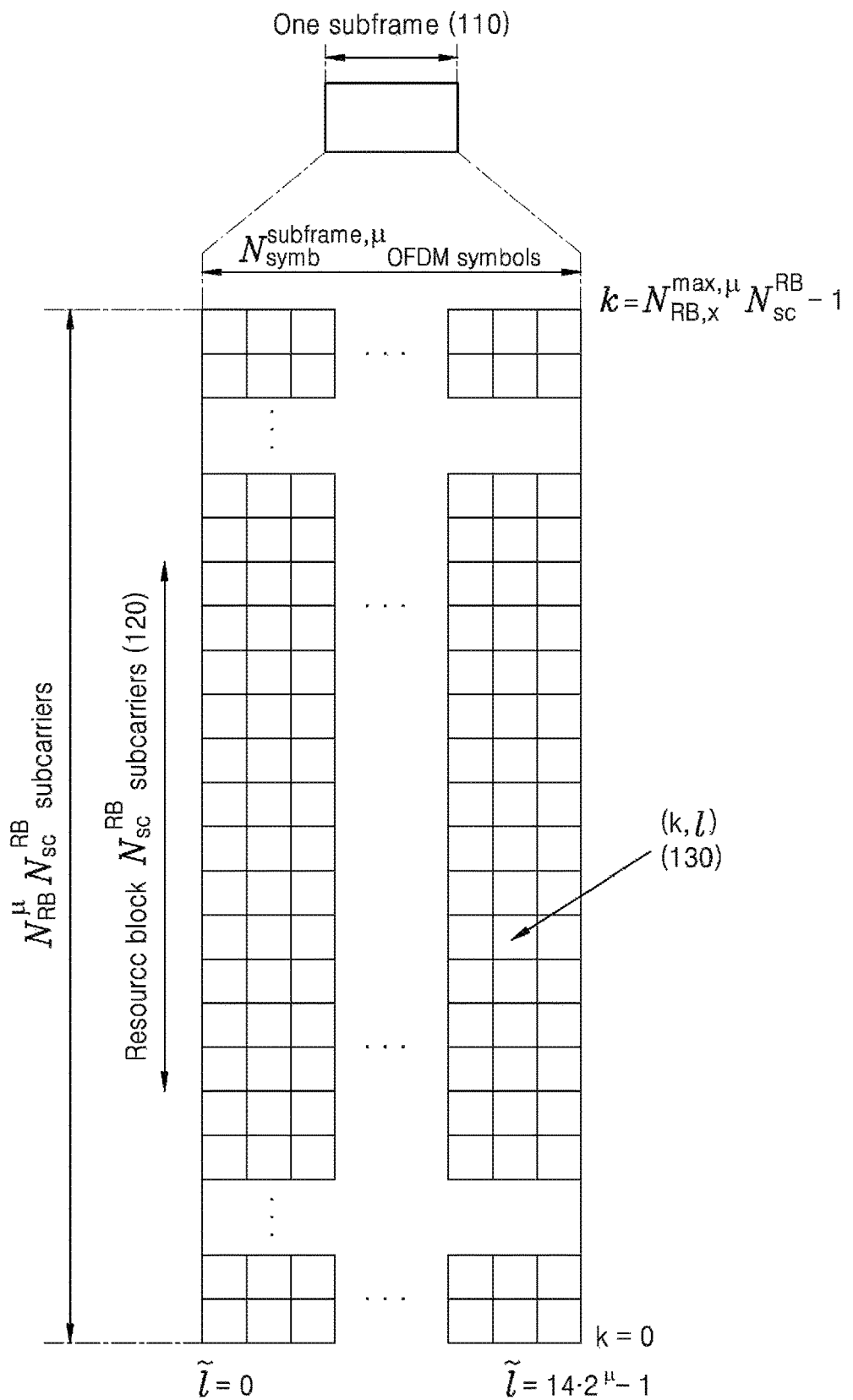
FIG. 1 is a diagram of a time-frequency resource structure of a 5th generation (5G) or new radio (NR) system.

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may use corresponding components regardless of importance or an order and are used to distinguish a component from another without limiting the components. These terms may be used for the purpose of distinguishing one element from another element. For example, a first user device and a second user device indicates different user devices regardless of the order or importance. For example, a first element may be referred to as a second element without departing from the scope the disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

The terms used in describing the various embodiments of the disclosure are for the purpose of describing particular embodiments and are not intended to limit the disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. Terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the disclosure.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of an application-specific integrated circuit (ASIC) chip, a field-programmable gate array (FPGA), and a programmable-logic device for performing operations which has been known or are to be developed hereinafter.

An electronic device according to the disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an IoT device (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include an electronic device according to the development of new technology.

Hereinafter, an electronic device will be described with reference to the accompanying drawings. In the disclosure, the term "user" indicates a person using an electronic device or a device (e.g., an artificial intelligence electronic device) using an electronic device.

The terms used in the specification are defined considering functions used in the present disclosure, and may be changed according to the intent or known methods of operators and users. Accordingly, definitions of the terms should be understood on the basis of the entire description of the present specification. In the following description, the term evolved node B (eNB) refers to an entity for allocating resources for a UE and may be used interchangeably with at least one of a next-generation node B (gNB), a node B, a base station (BS), a radio access unit, a base station controller (BSC), or a node on a network. The term UE may be used interchangeably with a mobile station (MS), a cellular phone, a smartphone, a computer, or a multimedia system having a communication function. Herein, an uplink (UL) refers to a radio link from a UE to an eNB.

Wireless communication systems have evolved from early systems providing voice-oriented services to broadband wireless communication systems providing high-speed and high-quality packet data services as in the communication standards such as high speed packet access (HSPA), long-term evolution (LTE) or evolved universal terrestrial radio access (E-UTRA), LTE-advanced (LTE-A), and LTE-pro of 3GPP, high rate packet data (HRPD) and ultra mobile broadband (UMB) of 3GPP2, and 802.16e of IEEE.

As a representative example of the broadband wireless communication systems, the LTE system employs orthogonal frequency division multiplexing (OFDM) for downlink (DL) transmission and employs single-carrier frequency division multiple access (SC-FDMA) for UL transmission. A UL refers to a radio link through which a UE or MS transmits data or control signals to an eNB or BS, and a DL refers to a radio link through which an eNB or BS transmits data or control signals to a UE or MS. In such a multiple access scheme, time-frequency resources carrying data and control information of each user are generally allocated and used not to overlap to achieve orthogonality, thereby distinguishing between the data and the control information.

FIG. 1 is a diagram of a time-frequency resource structure of a 5th generation (5G) or new radio (NR) system.

Referring to FIG. 1, the horizontal axis indicates the time domain and the vertical axis indicates the frequency domain. The smallest transmission unit in the time domain is an OFDM symbol for a DL and is an OFDM or discrete Fourier transform spread OFDM (DFT-S-OFDM) symbol for a UL, and 14 symbols configure one slot ($N_{symb}^{slot}$) for a normal cyclic prefix (NCP). Depending on a numerology supported by the NR system, multiple symbols configure one subframe 110. One subframe 110 is defined as 1 ms. The number of OFDM or DFT-S-OFDM symbols for configuring the subframe 110 is as shown in Table 1 and Table 2.

TABLE 1

Number of OFDM symbols per slot, $N_{symb}^{slot}$ for normal cyclic prefix

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 2

Number of OFDM symbols per slot, $N_{slot}^{symb, \mu}$, for extended cyclic prefix

| μ | $N_{symb}^{slot}$ | $N_{slot}^{frame, \mu}$ | $N_{slot}^{subframe, \mu}$ |
|---|---|---|---|
| 2 | 12 | 40 | 4 |

The smallest transmission unit in the frequency domain is a subcarrier and a whole system transmission bandwidth includes a total of $N_{RB,x}^{max,\mu} N_{sc}^{RB}$ subcarriers. Herein, the value of $N_{RB,x}^{max,\mu}$ for the UL and DL is given in Table 3. $N_{sc}^{RB}$ indicates a resource block (RB) 120 and is defined as 12 consecutive subcarriers in the frequency domain. A basic resource unit in the time-frequency domain is a resource element (RE) 130 and may be defined by an OFDM/DFT-S-OFDM symbol index and a subcarrier index.

TABLE 3

| μ | $N_{RB, DL}^{min, \mu}$ | $N_{RB, DL}^{max, \mu}$ | $N_{RB, UL}^{min, \mu}$ | $N_{RB, UL}^{max, \mu}$ |
|---|---|---|---|---|
| 0 | 20 | 275 | 24 | 275 |
| 1 | 20 | 275 | 24 | 275 |
| 2 | 20 | 275 | 24 | 275 |
| 3 | 20 | 275 | 24 | 275 |
| 4 | 20 | 138 | 24 | 138 |
| 5 | 20 | 09 | 24 | 69 |

Wireless communication systems use a multi-antenna technology as one technology for improving UL performance. A representative example thereof is single-user multiple input multiple output (SU-MIMO) and a base station may improve UL performance by using up to four transmit antennas for the UL. In this regard, the base station needs to determine a precoding matrix to be used by each UE, by estimating a channel status per transmit antenna of the UE for a whole UL transmission bandwidth. The base station may obtain UE-specific UL channel information by receiving a sounding reference signal (SRS) from each UE. The base station performs precoding matrix determination, selective UL frequency scheduling, power control, and modulation and coding scheme (MCS) level selection based on the obtained UE-specific UL channel information.

Figure 2:
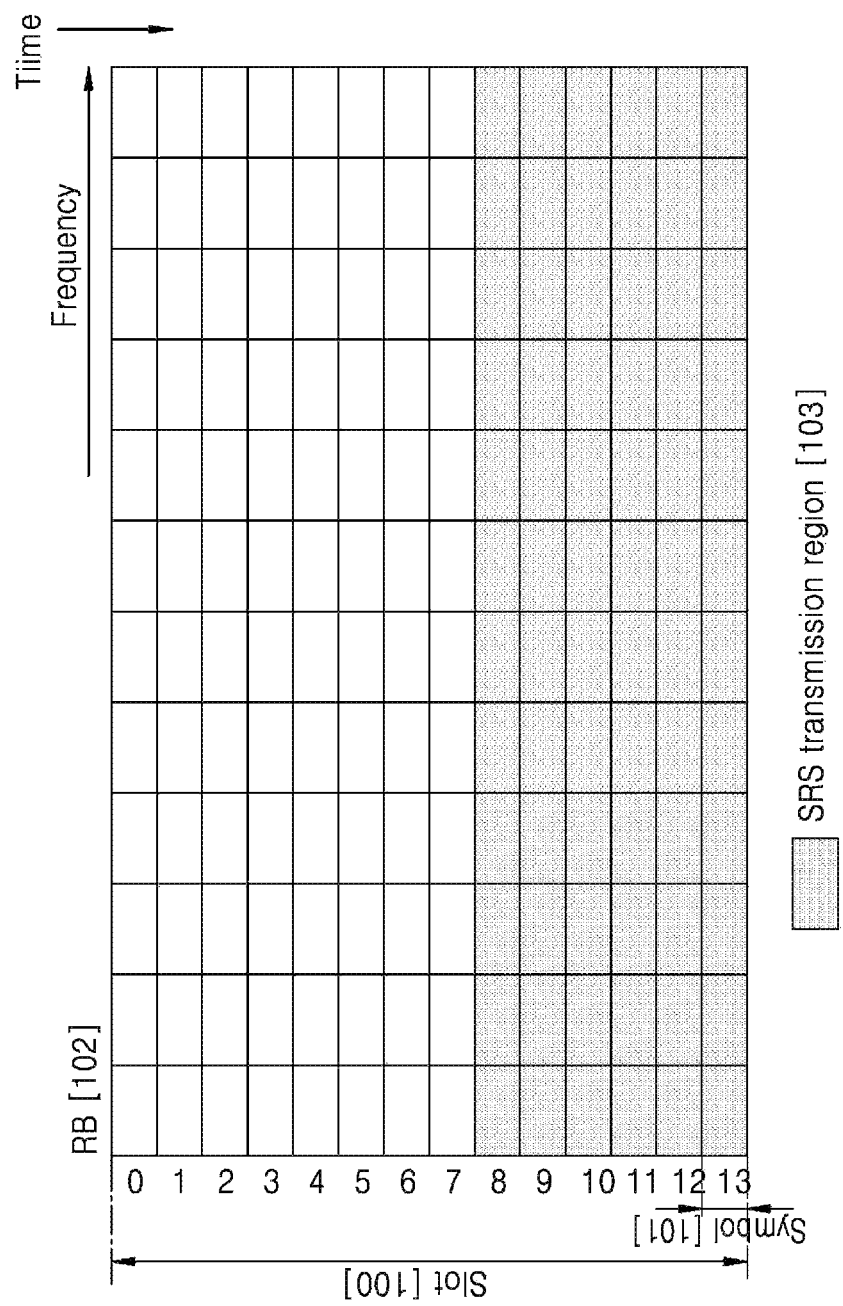
FIG. 2 is a diagram of an uplink (UL) transmission structure of a 5G or NR system.

FIG. 2 is a diagram of a UL transmission structure of a 5G or NR system.

Referring to FIG. 2, a basic transmission unit of the 5G or NR system is a slot 100. Assuming a normal length of a cyclic prefix (CP), each slot includes 14 symbols 101 each corresponding to one UL waveform (CP-OFDM or DFT-S-OFDM) symbol.

An RB 102 is a resource allocation unit corresponding to one slot on the basis of the time domain and includes 12 subcarriers on the basis of the frequency domain.

The UL structure is largely divided into a data region and a control region. Unlike an LTE system, in the 5G or NR system, the control region may be configured and transmitted at an arbitrary location of a UL. Herein, the data region includes a series of communication resources including, for example, voice or packet data transmitted to each UE, and corresponds to resources excluding the control region in a subframe. The control region includes a series of communication resources for a DL channel quality report, a DL signal reception acknowledgement (ACK)/negative acknowledgement (NACK), a UL scheduling request, etc., from each UE.

The UE may simultaneously transmit data and control information in the data region and the control region. The UE may periodically transmit an SRS in a period of the last 6 symbols 103 in one slot and through a data transmission band on the basis of the frequency domain. However, the symbols carrying the SRS may be transmitted in another time period or through another frequency band. The SRS is transmitted using a multiple of 4 RBs in the frequency domain and may be transmitted using up to 272 RBs. The 5G or NR system may configure the number of SRS symbols, N to be 1, 2, or 4 and transmit the SRS symbols by using consecutive symbols. In addition, the 5G or NR system may enable repeated transmission of the SRS symbols. Specifically, an SRS symbol repetition factor may be configured to be $r \in \{1, 2, 4\}$, where $r \leq N$. When one SRS antenna is mapped to one symbol and the symbol is transmitted, the symbol may be repeatedly transmitted up to 4 times. Four different antenna ports may transmit four different symbols. In this case, each antenna port is mapped to one symbol and thus repeated transmission of the SRS symbols is not enabled.

The SRS includes a constant amplitude zero auto-correlation (CAZAC) sequence. CAZAC sequences included in SRSs transmitted from multiple UEs have different cyclic shift values. CAZAC sequences generated due to cyclic shifts from one CAZAC sequence have a zero correlation value with the other sequences having different cyclic shift values. Using zero correlation characteristics, the SRSs simultaneously allocated to the same frequency domain may be distinguished in accordance with CAZAC sequence cyclic shift values configured for the SRSs by a base station.

The SRSs of the multiple UEs may be distinguished in accordance with frequency locations as well as the cyclic shift values. The frequency locations are distinguished in accordance with allocation of a SRS subband unit or a comb. The 5G or NR system supports Comb2 and Comb4. In the case of Comb2, one SRS is allocated to only even or odd subcarriers in a SRS subband, and the even or odd subcarriers configure one comb.

Each UE receives allocation of a SRS subband based on a tree structure. The UE performs hopping on a SRS allocated to each subband at every SRS transmission timing. As such, all transmit antennas of the UE may transmit SRSs through a whole UL data transmission bandwidth.

Figure 3:
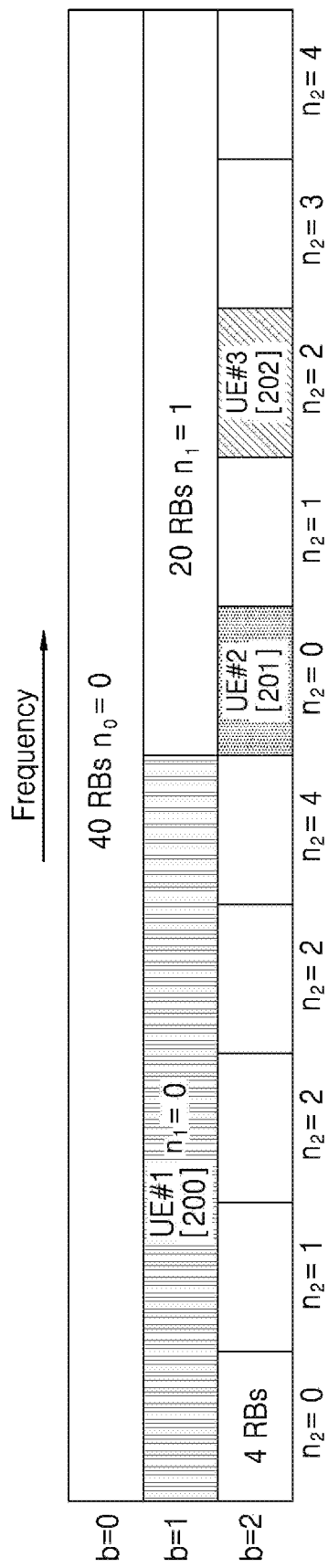
FIG. 3 is a diagram of a structure in which a sounding reference signal (SRS) is allocated per subband.

FIG. 3 is a diagram of a structure in which an SRS is allocated per subband.

Referring to FIG. 3, an example in which an SRS subband is allocated for each UE based on a tree structure configured by a base station when a data transmission bandwidth corresponds to 40 RBs in the frequency domain is shown.

In FIG. 3, assuming that a level index of the tree structure is denoted by b, a top level (b=0) of the tree structure includes one SRS subband having a bandwidth of 40 RBs. At a second level (b=1), two SRS subbands each having a bandwidth of 20 RBs are generated from the SRS subband of the level b=0. Therefore, two SRS subbands are present in a whole data transmission band of the second level (b=1). At a third level (b=2), five 4-RB SRS subbands are generated from each 20-RB SRS subband of the upper level (b=1) and thus a total of ten 4-RB SRS subbands are present.

The tree structure may have various numbers of levels, various SRS subband sizes, and various numbers of SRS subbands per level in accordance with configuration of the base station. Herein, the number of SRS subbands of a level b, which are generated from one SRS subband of an upper level, may be defined as $N_b$, and indexes of the $N_b$ SRS subbands may be defined as $n_b = \{0, \ldots, N_b-1\}$. Since subbands per level vary as described above, a subband of each level is allocated for a UE as illustrated in FIG. 2. A first SRS subband ($n_1$=0) among the two 20-RB SRS subbands at the level b=1 may be allocated for a UE 1 200, and a first SRS subband ($n_2$=0) and a third SRS subband ($n_2$=2) under a second 20-RB SRS subband may be respectively allocated for a UE 2 201 and a UE 3 202. As such, the UEs may simultaneously transmit SRSs through multiple component carriers (CCs) or through multiple SRS subbands in one CC.

As described above, 5G or NR UEs support SU-MIMO and have up to four transmit antennas. In addition, the UEs may simultaneously transmit SRSs through multiple CCs or through multiple SRS subbands in a CC. Unlike an LTE system, a 5G or NR system may support various numerologies, variously configure SRS symbols, and enable repeated transmission of the SRS symbols. For the 5G or NR system, it is determined to support SRS antenna switching for 1Tx (in the case of UE with 1T2R), 2Tx (in the case of UE with 2T4R), and 4Tx (in the case of UE with 1T4R). In the 5G or NR system, configuration of four receive antennas for a UE is regarded as a crucial scenario and SRS antenna switching needs to be effectively supported to allow the base station to obtain channel information of all the four receive antennas considering channels satisfying UL/DL reciprocity. Therefore, the 5G or NR system requires technologies for performing and controlling SRS transmission through multiple antennas.

Although the following description is focused on the 5G or NR system, the present disclosure may also be applied to other communication systems having similar technical backgrounds or channel configurations. Therefore, the present disclosure may also be applied to the other communication systems through partial modification thereof by one of ordinary skill in the art without greatly departing from the scope of the present disclosure.

The 5G or NR system not only supports various numerologies but also supports multiple SRS transmitting OFDM symbols and an SRS symbol repetition factor. Therefore, SRS transmission counting considering the above is required. SRS transmission counting may be used in various ways. SRS transmission counting may be used to support antenna switching based on SRS transmission. Specifically, SRS transmission counting may be used to determine which antenna is to be used for transmission at which SRS transmission timing. In the present disclosure, a SRS transmission counting method considering a numerology of a 5G or NR system, the number of SRS transmitting OFDM symbols, a SRS symbol repetition factor, etc., will be described. Furthermore, an antenna selection method in a case when SRS antenna switching is supported for 1Tx (in the case of UE with 1T2R), 2Tx (in the case of UE with 2T4R), and 4Tx (in the case of UE with 1T4R) will be described.

An SRS transmission counting method considering a numerology of a 5G or NR system, the number of SRS transmitting OFDM symbols, an SRS symbol repetition factor, etc., is described herein. Location configuration for SRS frequency hopping may vary depending on an SRS transmission timing, and antenna selection for SRS antenna switching may also vary depending on the SRS transmission timing. Therefore, in the 5G or NR system, definition of SRS transmission counting is very significant for SRS transmission. The following needs to be considered for SRS transmission counting.

Numerology ($\mu$)
SRS periodicity ($T_{SRS}$)
Number of SRS symbols, (N)
SRS symbol repetition factor (r)

Since the 5G or NR system supports various numerologies and the number of slots in a frame varies depending on a subcarrier spacing, the numerology and the number of slots need to be considered for SRS transmission counting. Table 1 and Table 2 define the number of slots per frame, $N_{slot}^{frame,\mu}$ based on a numerology $\mu$ supported by the 5G or NR system. Therefore, the number of slots in a frame may be counted as $n_{s,f}^{\mu} \in \{0, \ldots, n_{slot}^{frame,\mu}-1\}$. Alternatively, SRS transmission counting may be performed based on an SRS periodicity. In the 5G or NR system, the SRS periodicity may be defined as the number of slots. Specifically, Table 4 defines the SRS periodicity ($T_{SRS}$) and an offset value ($T_{offset}$) for the 5G or NR system by using 12 bits. For example, in Table 4, when $T_{SRS}$ is configured to 2 slots and $T_{offset}$ is 0, SRS transmission is performed in an even slot, $n_{s,f}^{\mu}$ of which is 0, 2, 4, 6 . . .

TABLE 4

An example of UE specific periodicity $T_{SRS}$ and slot offset configuration $T_{offset}$ for periodic SRS transmission

| SRS Configuration Index $I_{SRS}$ | SRS Periodicity, $T_{SRS}$ (slot) | SRS slot Offset $T_{offset}$ | Note |
| --- | --- | --- | --- |
| 0-1 | 2 | $I_{SRS}$ | LTE supported |
| 2-5 | 4 | $I_{SRS}$ − 4 | Considering DL/UL configuration switching periodicity |
| 6-10 | 5 | $I_{SRS}$ − 6 | LTE supported |
| 11-18 | 8 | $I_{SRS}$ − 11 | Considering DL/UL configuration switching periodicity |
| 19-28 | 10 | $I_{SRS}$ − 19 | LTE supported |
| 29-44 | 16 | $I_{SRS}$ − 29 | Considering DL/UL configuration switching periodicity |
| 45-64 | 20 | $I_{SRS}$ − 45 | LTE supported |
| 65-96 | 32 | $I_{SRS}$ − 65 | Considering DL/UL configuration switching periodicity |
| 97-136 | 40 | $I_{SRS}$ − 97 | LTE supported |
| 137-200 | 64 | $I_{SRS}$ − 137 | Considering DL/UL configuration switching periodicity |
| 201-280 | 80 | $I_{SRS}$ − 201 | LTE supported |
| 281-408 | 128 | $I_{SRS}$ − 281 | Considering DL/UL configuration switching periodicity |
| 409-568 | 160 | $I_{SRS}$ − 409 | LTE supported |
| 569-824 | 256 | $I_{SRS}$ − 569 | Considering DL/UL configuration switching periodicity |
| 825-1144 | 320 | $I_{SRS}$ − 825 | LTE supported |
| 1145-1656 | 512 | $I_{SRS}$ − 1145 | Considering DL/UL configuration switching periodicity |
| 1657-2296 | 640 | $I_{SRS}$ − 1645 | CSI-RS supported |
| 2297-4095 | reserved | reserved | |

The number of SRS symbols and an SRS symbol repetition factor need to be used for SRS transmission counting. The 5G or NR system may configure the number of SRS symbols, N to be 1, 2, or 4 and transmit the SRS symbols by using consecutive symbols. In addition, the 5G or NR system may enable repeated transmission of the SRS symbols. Specifically, the SRS symbol repetition factor may be configured to be $r \in \{1, 2, 4\}$, where $r \leq N$. The number of SRS symbols, N, and the SRS symbol repetition factor, r, may be independently configured through radio resource control (RRC) configuration or may be indirectly configured for the UE by using other signaling parameters. More specifically, influence of the number of SRS symbols and the SRS symbol repetition factor on SRS transmission counting will now be described with reference to FIG. 4.

Figure 4:
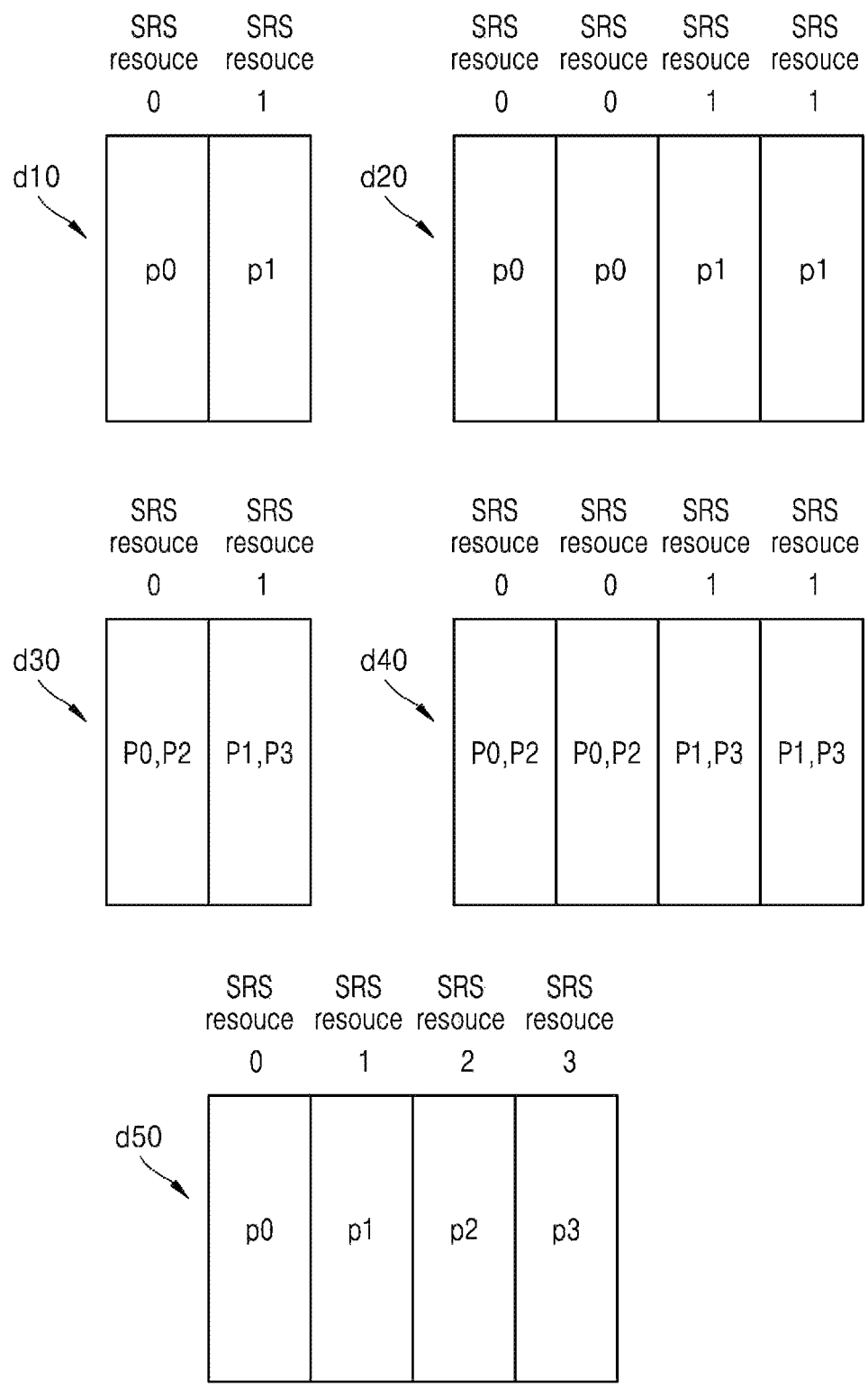
FIG. 4 is a diagram of an SRS transmission counting method, according to an embodiment.

FIG. 4 is a diagram of an SRS transmission counting method, according to an embodiment.

A 5G or NR system may configure multiple SRS resources and use X-port SRS resources to transmit N adjacent OFDM symbols in the same slot. FIG. 4 shows an example of mapping between antennas and SRS symbols considering SRS antenna switching.

In FIG. 4, d10 indicates a case in which two antennas transmit OFDM symbols by using two SRS resources. In this case, N=2 and r=1, one SRS resource is defined for each symbol, and different antennas p0 and p1 may transmit at each SRS resource.

d20 indicates another case in which two antennas transmit OFDM symbols by using two SRS resources. In this case, N=4 and r=2, one SRS resource is defined for two adjacent symbols, and different antennas p0 and p1 may transmit at each SRS resource.

d30 indicates a case in which two antennas transmit OFDM symbols by using one SRS resource. In this case, N=2 and r=1, one SRS resource is defined for each symbol and different antenna pairs (e.g., pair0 (p0, p2) and pair1 (p1, p3)) may transmit at each SRS resource. The antenna pairs may also be configured as pair0 (p0, p1) and pair1 (p2, p3).

d40 indicates another case in which two antennas transmit OFDM symbols by using one SRS resource. In this case, N=4 and r=2, one SRS resource is defined for two adjacent symbols and different antenna pairs (e.g., pair0 (p0, p2) or pair1 (p1, p3)) may transmit at each SRS resource. The antenna pairs may also be configured as pair0 (p0, p1) and pair1 (p2, p3).

d50 indicates a case in which four antennas transmit OFDM symbols by using four SRS resources. In this case, N=4 and r=1, one SRS resource is defined for each symbol and different antennas p0, p1, p2, and p3 may transmit at each SRS resource. Therefore, considering SRS antenna switching as described above, the number of SRS symbols and an SRS symbol repetition factor may vary and thus SRS transmission counting is required. Considering all factors required for SRS transmission counting, an SRS transmission count $n_{SRS}$ may be expressed as shown by Equation (1-1):

$$n_{SRS} = \lfloor (n_f N_{slot}^{frame,\mu} + n_{s,f}^{\mu})/T_{SRS} \rfloor \times \frac{N}{r} + i, i = 0, \ldots, \frac{N}{r} - 1. \quad (1\text{-}1)$$

In Equation (1-1), $n_f$ denotes a frame number and the other parameters are described above. For example, in d50 of FIG. 4, when $\mu$=0 $n_f$=0 and $n_{s,f}^{\mu}$=0, $n_{SRS}$ may have a value of $n_{SRS}$=0, 1, 2, 3 in one slot. The above-described SRS transmission counting method may provide a crucial value for determining parameters for SRS transmission. A detailed description thereof will now be provided.

Considering aperiodic SRS transmission, since transmission needs to be performed in one slot, the SRS transmission count $n_{SRS}$ may be expressed as shown by Equation (1-2):

$$n_{SRS} = 0, \ldots, \frac{N}{r} - 1 \quad (1\text{-}2)$$

The number of frames, $n_f$, the number of slots, $n_{2,f}^{\mu}$, and the SRS periodicity $T_{SRS}$ do not need to be configured as in Equation (1-1). More specifically, considering SRS antenna switching as illustrated in FIG. 4 and considering only transmission in one slot in the mapping structure between antennas and SRS symbols, the SRS transmission count $n_{SRS}$ may be calculated using only the number of SRS symbols, N, and the SRS symbol repetition factor r. Periodic or semi-persistent SRS transmission is performed in one or more slots and thus may be counted using Equation (1-1), and aperiodic SRS transmission is completed in one slot and thus may be counted using Equation (1-2). Calculation of the SRS transmission count $n_{SRS}$ in Equation (1-1) and Equation (1-2) may be understood as accumulative counting of used SRS resources. An operation thereof will now be described with reference to FIG. 5.

Figure 5:
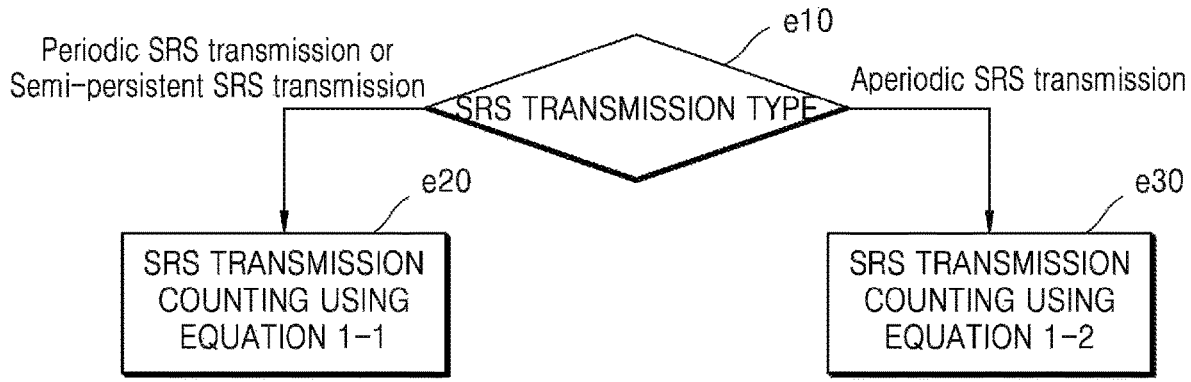
FIG. 5 is a diagram of an SRS transmission counting method based on an SRS transmission type, according to an embodiment.

FIG. 5 is a diagram of an SRS transmission counting method based on an SRS transmission type, according to an embodiment.

Referring to FIG. 5, a different SRS transmission counting method is used based on an SRS transmission type. When the SRS transmission type is configured as periodic or semi-persistent SRS transmission at step e10, the method may proceed to step e20 and SRS transmission counting may be performed using Equation (1-1). Otherwise, when the SRS transmission type is configured as aperiodic SRS transmission at step e10, the method may proceed to step e30 and SRS transmission counting may be performed using Equation (1-2).

In general, periodic SRS transmission may be performed by configuring a SRS periodicity $T_{SRS}$ and an offset value $T_{offset}$ through RRC as shown in Table 4. For semi-persistent SRS transmission, a method of activating or deactivating SRS transmission by using a media access control (MAC) control element (CE) when required may be considered. For aperiodic SRS transmission, a method of activating or deactivating SRS transmission by using downlink control information (DCI) may be considered. Periodic SRS transmission may allow a base station to periodically obtain channel information, and aperiodic SRS transmission may allow the base station to obtain more accurate channel information based on triggering of the base station only when required.

An antenna selection method based on the above-described SRS transmission counting method when SRS antenna switching is supported for 1Tx (in the case of UE with 1T2R), 2Tx (in the case of UE with 2T4R), and 4Tx (in the case of UE with 1T4R) will now be described. In a 5G or NR system, configuration of four receive antennas for a UE is regarded as a crucial scenario. In this case, SRS antenna switching needs to be effectively supported to allow the base station to obtain channel information of all the four receive antennas considering channels satisfying UL/DL reciprocity. Specifically, when the UE has R receive antennas and performs SRS transmission through up to T antenna ports and when R>T, the base station needs to measure all channels for the R antennas to measure all DL channels based on UL SRSs. In this regard, SRS antenna switching is required.

Rules of SRS hopping and antenna selection patterns considering frequency hopping for SRS antenna switching are as described below.

Rule 1: Antenna switching is supported to enable channel estimation for all antenna ports in one SRS subband.

Rule 2: Frequency hopping needs to uniformly occur across a configured SRS bandwidth such that the bases station may rapidly obtain rough channel information for a whole SRS transmission band within a short time.

Rule 3: When transmission is simultaneously performed through multiple SRS antennas, antennas spaced farthest apart from each other are paired considering antenna correlations.

More specifically, Table 5, Table 6, and Table 7 show examples of the antenna selection method when SRS antenna switching is supported for 1Tx (in the case of UE with 1T2R), 2Tx (in the case of UE with 2T4R), and 4Tx (in the case of UE with 1T4R). It is assumed that a SRS bandwidth is divided into four SRS subbands. Frequency hopping during SRS transmission is considered. Therefore, SRS transmission is performed in one of the four SRS subbands based on the above-described SRS transmission count $n_{SRS}$.

For antenna selection and SRS hopping, an example of (R, T)=(2,1) is shown in Table 5. Referring to Table 5, transmission through SRS antenna ports 0 and 1 for a whole configured SRS transmission band is completed while $n_{SRS}$ is being increased to 8.

TABLE 5

An example of antenna switching with
SRS frequency hopping, (R, T) = (2, 1)

| $n_{SRS}$ | First part of SRS BW | Second part SRS BW | Third part of SRS BW | Fourth part of SRS BW |
|---|---|---|---|---|
| 0 | SRS port 0 | | | |
| 1 | | | | SRS port 1 |
| 2 | | SRS port 1 | | |
| 3 | | | | SRS port 0 |
| 4 | SRS port 1 | | | |
| 5 | | | | SRS port 0 |
| 6 | | SRS port 0 | | |
| 7 | | | | SRS port 1 |

For antenna selection and SRS hopping, an example of (R, T)=(4,1) is shown in Table 6. Referring to Table 6, transmission through SRS antenna ports 0 to 3 for a whole configured SRS transmission band is completed while $n_{SRS}$ is being increased to 16. Compared to Table 5, in Table 6, a double $n_{SRS}$ is required for transmission through all four antenna ports to the base station. However, rough channel information for the whole SRS transmission band may be obtained even before $n_{SRS}$ reaches 15 according to Rule 2.

TABLE 6

An example of antenna switching with
SRS frequency hopping, (R, T) = (4, 1)

| $n_{SRS}$ | First part of SRS BW | Second part of SRS BW | Third part of SRS BW | Fourth part of SRS BW |
|---|---|---|---|---|
| 0 | SRS port 0 | | | |
| 1 | | | | SRS port 1 |
| 1 | | SRS port 2 | | |
| 3 | | | | SRS port 3 |
| 4 | SRS port 1 | | | |
| 5 | | | | SRS port 2 |
| 6 | | SRS port 3 | | |
| 7 | | | | SRS port 0 |
| 8 | SRS port. 2 | | | |
| 9 | | | | SRS port 3 |
| 10 | | SRS port 0 | | |
| 11 | | | | SRS port 1 |
| 12 | SRS port 3 | | | |
| 13 | | | | SRS port 0 |
| 14 | | SRS port 1 | | |
| 15 | 5 | | | SRS port 3 |

For antenna selection and SRS hopping, an example of (R, T)=(4,2) is shown in Table 7. Referring to Table 7, transmission through SRS antenna ports 0 to 3 for a whole configured SRS transmission band is completed while $n_{SRS}$ is being increased to 8. Compared to Table 6, in Table 7, since transmission is performed through two antennas at a time, a half $n_{SRS}$ is required to obtain channel information for the whole SRS transmission band. In addition, for simultaneous transmission through two antennas, antennas are paired to pair0 (p0, p2) and pair1 (p1, p3) instead of pair0 (p0, p1) and pair1 (p2, p3) to achieve the lowest correlation between the pair antennas according to Rule 3.

TABLE 7

An example of antenna switching with
SRS frequency hopping, (R, T) = (4, 2)

| $n_{SRS}$ | First part of SRS BW | Second part of SRS BW | Third part of SRS BW | Fourth part of SRS BW |
|---|---|---|---|---|
| 0 | SRS port 0, 2 | | | |
| 1 | | | | SRS port 1, 3 |
| 2 | | SRS port 1, 3 | | |
| 3 | | | | SRS port 0, 2 |
| 4 | SRS port 1, 3 | | | |
| 5 | | | | SRS port 0, 2 |
| 6 | | SRS port 0, 2 | | |
| 7 | | | | SRS port 1, 3 |

An antenna selection method when SRS antenna switching is supported may be expressed as shown by the following equations. When the UE supports antenna selection for SRS antenna switching, an index $a(n_{SRS})$ may be defined as follows.

For a UE that supports transmit antenna selection, the index $a(n_{SRS})$ of the UE antenna that transmits the SRS at time nSRS is given for both partial and full sounding bandwidth when frequency hopping is disabled (i.e., $b_{hop} \geq B_{SRS}$) as Equation (2):

$$a(n_{SRS}) = n_{SRS} \bmod \frac{R}{T} + i, \; i = 0 \text{ and } 2(M-1) \quad (2)$$

and when frequency hopping is enabled (i.e., $b_{hop} < B_{SRS}$) as Equation (3):

$$a(n_{SRS}) = \begin{cases} \left(n_{SRS} + \left\lfloor n_{SRS}\frac{T}{R} \right\rfloor + \beta \cdot \left\lfloor \frac{n_{SRS}}{K} \right\rfloor \right) \bmod \frac{R}{T} + i, \; i = 0 \text{ and } 2(M-1), & \text{when } K \text{ is even} \\ n_{SRS} \bmod \frac{R}{T} + i, \; i = 0 \text{ and } 2(M-1), & \text{when } K \text{ is odd} \end{cases} \quad (3)$$

where $$\beta = \begin{cases} 1 & \text{where } K \bmod 4 = 0 \\ 0 & \text{otherwise} \end{cases},$$

values $B_{SRS} \in \{0,1,2,3\}$, $b_{hop} \in \{0,1,2,3\}$, $N_b$ are indicate SRS bandwidth, frequency hopping bandwidth, and the number of both SRS bandwidth to make one (b-1)th SRS bandwidth respectively, and $$K = \prod_{b'=b_{hop}}^{B_{SRS}} N_{b'} \text{ (where } N_{b_{hop}} = 1$$

regardless of the $N_b$ value).

Antenna selection when SRS antenna switching is supported for 1Tx (in the case of UE with 1T2R), 2Tx (in the case of UE with 2T4R), and 4Tx (in the case of UE with 1T4R) may be performed using Equations (2) and (3).

Efficient SRS transmission may be enabled through frequency hopping, antenna switching, etc., and improved SRS reception of the base station may be expected.

Figure 6:
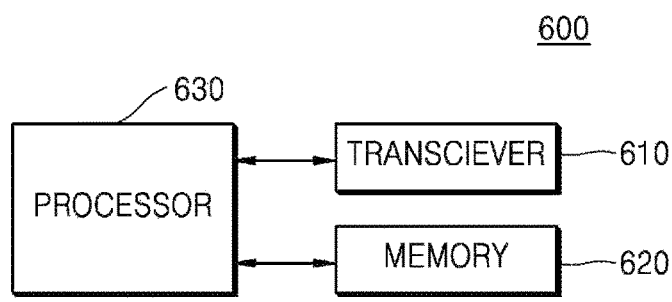
FIG. 6 is a diagram of a user equipment (UE), according to an embodiment.

FIG. 6 is a diagram of a UE 600, according to an embodiment.

Referring to FIG. 6, the UE 600 may include a transceiver 610, a memory 620, and a processor 630. The transceiver 610, the memory 620, and the processor 630 of the UE 600 may operate according to the above-described communication method of the UE 600. However, elements of the UE 600 are not limited to the above-mentioned elements. For example, the UE 600 may include a larger or smaller number of elements compared to the above-mentioned elements. In addition, the transceiver 610, the memory 620, and the processor 630 may be configured as one chip.

The transceiver 610 may transmit and receive signals to and from a base station. Herein, the signals may include control information and data. In this regard, the transceiver 610 may include a radio frequency (RF) transmitter for frequency-up-converting and amplifying a signal to be transmitted, and an RF receiver for low-noise amplifying and frequency-down-converting a received signal. However, the RF transmitter and the RF receiver are merely examples and elements of the transceiver 610 are not limited thereto.

In addition, the transceiver 610 may receive signals through radio channels and output the signals to the processor 630, and transmit signals output from the processor 630, through radio channels.

The memory 620 may store programs and data required to operate the UE 600. In addition, the memory 620 may store control information or data included in signals obtained by the UE 600. The memory 620 may include a storage medium such as read-only memory (ROM), random access memory (RAM), a hard disk, a compact disc (CD)-ROM, or a digital versatile disc (DVD), or a combination thereof.

The processor 630 may control a series of processes to operate the UE 600. The processor 630 may control SRS transmission counting and control antenna selection in a case when SRS antenna switching is supported.

Figure 7:
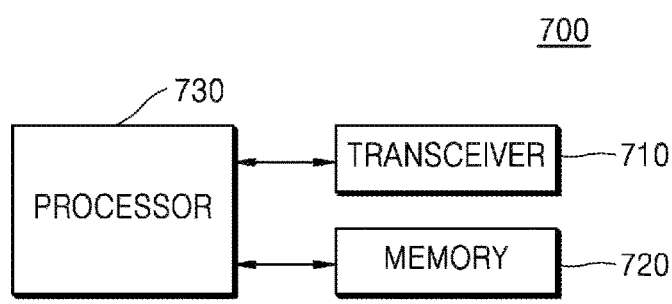
FIG. 7 is a diagram of a base station, according to an embodiment.

FIG. 7 is a diagram of a base station 700, according to an embodiment.

Referring to FIG. 7, the base station 700 may include a transceiver 710, a memory 720, and a processor 730. The transceiver 710, the memory 720, and the processor 730 of the base station 700 may operate according to the above-described communication method of the base station 700. However, elements of the base station 700 are not limited to the above-mentioned elements. For example, the base station 700 may include a larger or smaller number of elements compared to the above-mentioned elements. In addition, the transceiver 710, the memory 720, and the processor 730 may be configured as one chip.

The transceiver 710 may transmit and receive signals to and from a UE. Herein, the signals may include control information and data. In this regard, the transceiver 710 may include an RF transmitter for frequency-up-converting and amplifying a signal to be transmitted, and an RF receiver for low-noise amplifying and frequency-down-converting a received signal. However, the RF transmitter and the RF receiver are merely examples and elements of the transceiver 710 are not limited thereto.

In addition, the transceiver 710 may receive signals through radio channels and output the signals to the processor 730, and transmit signals output from the processor 730, through radio channels.

The memory 720 may store programs and data required to operate the base station 700. In addition, the memory 720 may store control information or data included in signals obtained by the base station 700. The memory 720 may include a storage medium such as ROM, RAM, a hard disk, a CD-ROM, or a DVD, or a combination thereof.

The processor 730 may control a series of processes to operate the base station 700. The processor 730 may control SRS transmission counting and control antenna selection in a case when SRS antenna switching is supported.

It should be understood that embodiments described herein should be considered in a descriptive sense only and not for purposes of limitation. Descriptions of features or aspects within each embodiment should be considered as available for other similar features or aspects in other embodiments. The afore-described embodiments may operate in combination when required. For example, a base station and a UE may operate according to a combination of parts of the embodiments. Although the embodiments have been described on the basis of a NR system, modifications thereof based on the technical aspects of the embodiments are applicable to other systems such as frequency division duplex (FDD) and time division duplex (TDD) LTE systems.

Various embodiments of the present disclosure may be implemented by software including an instruction stored in a machine-readable storage media readable by a machine (e.g., a computer). The machine may be a device that calls the instruction from the machine-readable storage media and operates depending on the called instruction and may include the electronic device. When the instruction is executed by the processor, the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method according to various embodiments disclosed in the present disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components may be integrated in one component and may perform the same or similar functions performed by each corresponding components prior to the integration. Operations performed by a module, a programming, or other components according to various embodiments of the present disclosure may be executed sequentially, in parallel, repeatedly, or in a heuristic method. Also, at least some operations may be executed in different sequences, omitted, or other operations may be added.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. A method of transmitting a sounding reference signal (SRS) of a user equipment in a wireless communication system, the method comprising:
identifying an SRS transmission count based on a slot number within a frame for a numerology, a number of slots per frame for the numerology, an SRS periodicity, a number of SRS symbols, an SRS repetition factor, a system frame number and a slot offset, in case that a periodic SRS transmission or a semi-persistent SRS transmission is configured; and
transmitting the SRS based on the SRS transmission count.

2. The method of claim 1, further comprising:
identifying the SRS transmission count based on the number of SRS symbols and the SRS repetition factor, in case that an aperiodic SRS transmission is configured.

3. The method of claim 2, wherein the SRS is transmitted in one slot, in case that the aperiodic SRS transmission is configured.

4. The method of claim 2, wherein the SRS repetition factor is less than the number of SRS symbols in case that the aperiodic SRS transmission is configured.

5. The method of claim 2, wherein configuration for the number of SRS symbols and the slot offset is received, from a base station, by a higher layer signaling.

6. The method of claim 1, wherein the SRS periodicity is identified based on the number of slots.

7. The method of claim 1, wherein configuration for the periodic SRS transmission of the SRS, configuration for the semi-persistent SRS transmission of the SRS or configuration for an aperiodic SRS transmission of the SRS is further received, from a base station, by a higher layer signaling.

8. The method of claim 1, wherein frequency hopping for the SRS is performed based on the SRS transmission count.

9. A user equipment for transmitting a sounding reference signal (SRS) in a wireless communication system, the user equipment comprising:
a transceiver;
at least one memory storing a program for transmitting the SRS; and
at least one processor configured to:
identify an SRS transmission count based on a slot number within a frame for a numerology, a number of slots per frame for the numerology, an SRS periodicity, a number of SRS symbols, an SRS repetition factor, a system frame number and a slot offset, in case that a periodic SRS transmission or a semi-persistent SRS transmission is configured; and
transmit the SRS based on the SRS transmission count.

10. The user equipment of claim 9, wherein the at least one processor is further configured to identify the SRS transmission count based on the number of SRS symbols and the SRS repetition factor, in case that an aperiodic SRS transmission is configured.

11. The user equipment of claim 10, wherein the SRS is transmitted in one slot, in case that the aperiodic SRS transmission is configured.

12. The user equipment of claim 10, wherein the SRS repetition factor is less than the number of SRS symbols in case that the aperiodic SRS transmission is configured.

13. The user equipment of claim 10, wherein configuration for the number of SRS symbols and the slot offset is received, from a base station, by a higher layer signaling.

14. The user equipment of claim 9, wherein the SRS periodicity is identified based on the number of slots.

15. The user equipment of claim 9 wherein the at least one processor is further configured to receive configuration for the periodic SRS transmission of the SRS, configuration for the semi-persistent SRS transmission of the SRS or configuration for an aperiodic SRS transmission of the SRS, from a base station, by a higher layer signaling.

16. The user equipment of claim 9, wherein frequency hopping for the SRS is performed based on the SRS transmission count.

* * * * *